United States Patent

Forsberg et al.

[11] Patent Number: 5,207,023
[45] Date of Patent: May 4, 1993

[54] DOOR FOR AN ELECTRIC SWITCH CABINET

[75] Inventors: Leif Forsberg, Myrgatan; Gunnar Nihlén, Östermovägen; Tore Nilsson, Ponnyvägen, all of Sweden

[73] Assignee: Kafak AB, Sundsvall, Sweden

[21] Appl. No.: 660,413

[22] Filed: Feb. 25, 1991

[30] Foreign Application Priority Data

Mar. 5, 1990 [SE] Sweden .................... 9000768

[51] Int. Cl.⁵ .............................. E05F 7/02
[52] U.S. Cl. ............................ 49/256; 49/395; 49/397; 49/483.1; 174/35 MS
[58] Field of Search ................ 49/397, 394, 255, 256, 49/395, 483; 292/DIG. 68; 312/222; 174/35 GC, 35 MS

[56] References Cited

U.S. PATENT DOCUMENTS

| | | | |
|---|---|---|---|
| 1,518,613 | 12/1924 | Teeter | 49/255 |
| 1,529,524 | 3/1925 | Wilbur | 49/255 |
| 1,895,572 | 1/1933 | Kellogg | 49/397 |
| 2,069,237 | 2/1937 | Fitch | 49/256 |
| 2,662,766 | 12/1953 | Burress | 49/397 |
| 2,717,064 | 9/1955 | Hock | 49/394 |
| 3,139,958 | 7/1964 | DeWitt | 49/397 |
| 3,534,501 | 10/1970 | Carlsson et al. | 49/397 |
| 3,820,282 | 6/1974 | Kornylak | 49/255 |
| 4,756,123 | 7/1988 | Roche et al. | 49/255 |

Primary Examiner—Michael F. Trettel
Assistant Examiner—Michael Milano
Attorney, Agent, or Firm—Robert G. Mentag

[57] ABSTRACT

The invention relates to a door for an electric switch cabinet comprising a door leaf made of a material isolating from fire and arcs, a hinge construction at a vertical edge of said door leaf and connectable to the cabinet frame, and a locking device cooperating with the door frame at the other vertical edge of said door leaf. In order to obtain an improved hinge construction regarding tightness and strength and to make the door lockable from all sides of the frame, the invention provides a hinge construction comprising a hinge composed of slidably and pivotably interengaging profile elements, latch means provided at the upper and lower edges of the door and being adapted to engage complementary latch means provided at the frame, and a jacking or lifting mechanism for vertically displacing the door via the hinge to bring the latch means and the complementary latch means into and out of engagement relative each other.

9 Claims, 4 Drawing Sheets

DOOR FOR AN ELECTRIC SWITCH CABINET

This invention relates to a door for an electric switch cabinet, comprising a door leaf made from sheet metal and/or other material insulating from electric arcs and fire, a hinge construction provided at a vertical longitudinal edge of the door leaf and connectable to the frame of the cabinet, and a locking device cooperating with the frame and provided at the opposite vertical edge of the door.

In order to increase the safety for persons working in electrical distribution plants against the effects of electric arcs that in very short periods of time can generate very high temperatures and pressures, for example on faulty short-circuiting in the switch or distribution boards, it is known to use board materials together with steel, which board materials are resistant to the arcs, isolate against fire and absorb the pressure shocks. A board material of this kind is known under the trade mark GIBOGI and consists of laminated boards of wood fiber and plaster.

Conventionally, the cabinet doors are hinged by longitudinal hinges of the piano hinge type which are bolted or spot welded to the cabinet frame and the door. However, such a hinge is not completely gas-tight and might also be a component of inferior strength in the door construction which together with the cabinet should encase the electric equipment for protection against burning-through, pressure shocks and exiting poisonous gases.

An object of the present invention is to provide a door for an electric switch cabinet of the kind described above, which door has an improved hinge construction and is lockable from all sides to the frame of the switch cabinet.

The invention provides a door for an electric switch cabinet, comprising a door leaf made of a material isolating from fire and arcs, a hinge construction at a vertical edge of said door leaf and connectable to the cabinet frame, and a locking device cooperating with the door frame at the other vertical edge of said door leaf, said hinge construction comprising a hinge composed of slidably and pivotably interengaging profile elements, latch means provided at the upper and lower edges of the door and adapted for engagement with complementary latch means provided at the frame, and a jacking mechanism for vertically displacing the door via said profile elements to bring said latch means and said complementary latch means into and out of engagement relative each other.

Since the door is supported from a hinge composed of slidably and pivotably interengaging profile elements, a very good sealing action and structural strength is obtained at this normally weak section of the door. The inherent slidability of the hinge profile elements relative each other is used in combination with the ratchet means and the jacking or lifting device to obtain the additional locking of the upper and lower edges of the door leaf. Thereby also the conventional locking mechanism at the lateral opening edge of the door can be replaced by stationary locking means such as locking members cooperating with key-hole openings and being brought into and out of engagement by the vertical displacement of the door.

Other objects and advantages of the invention will be apparent from the remaining claims and the following detailed description of an embodiment of the invention with reference to the drawing, where FIG. 1 is a front view of a door according to the invention;

Figure 1:
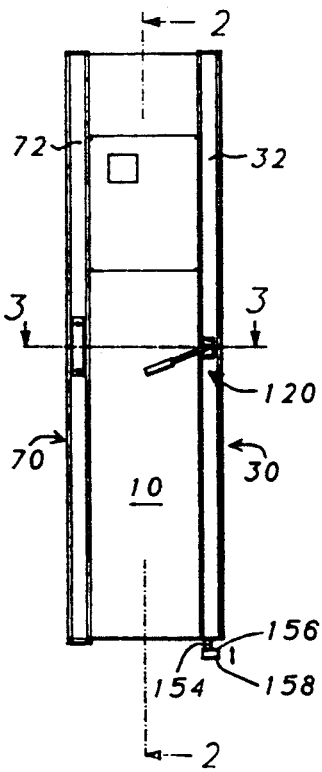

The door shown in FIG. 1 comprises a door leaf 10 the one vertical edge of which is connected to a hinge construction 30 and the other vertical edge of which is connected to a locking device 70. In its closed position the door is designed to cover an opening 104 (FIG. 2 and 3) defined by a frame construction 102 of a switch cabinet generally designed by reference numeral 100 and shown only fragmentarily.

According to the invention, the locking device 70 is not mounted in the door leaf 10 itself but incorporated in an independent constructional part comprising a profiled or shaped metal element 72, preferably an extruded aluminum profile, extending throughout the height of the door. The profile 72 (FIG. 6) has a closed channel 78 at the outside of the door and an open channel 74, 76 opening towards the longitudinal edge portion of the door leaf 10. The inner portion 76 of the open channel is intended to receive a locking bar 90 (described later), and the outer portion 74 of the open channel is used as a recess for receiving the corresponding edge portion 20 (FIG. 3) of the door leaf 10. A shoulder or flange 86 located between the channel portions 74 and 76 is acting as a stop for the edge portion 20. In the closed channel 78 of the profile 72 two screw pockets 80, 80 are provided for securing cover plates, indicated in FIG. 1, by screws at the longitudinal ends of the profile. The locking bar 90 shown in FIG. 3 extends substantially throughout the length of the profile 70 and is preferably bolted to the profile 70 by countersunk screws from the inside of the door (not shown). Moreover, in the locking bar 90 and in the inside flange of the profile 72, a plurality of key-hole shaped recesses (one only is shown) are provided uniformly spaced along the profile 72, each recess comprising a vertical slot 92 which is downwardly widened to a circular hole 94. In the closed position of the door, each keyhole recess 92, 94 is arranged to engage a corresponding locking member 96 having an enlarged head portion and protruting through an opening 106 from the frame construction 102. The opposite end of each locking member 96 is received in a respective bore 110 of a retaining bar 108 and secured thereto by a nut 98 at the threaded end portion thereof. The retaining bar 108 is in turn preferably bolted by countersunk screws at the front side of the frame construction 102. The opening 106 preferably has an oversize such that the retaining bar 108 and the respective locking members 96 can be adjusted relative the key-hole recesses 92, 94.

According to the invention, the hinge device 30 is designed as a closed profile element hinge consisting of two metal profiles 32, 60 extending over the full height of the door.

The door profile 32 (FIG. 7) of the hinge construction 30, i.e. the profile connected to the door leaf 10, has, like the profile 72 of the locking device, a closed longitudinal channel 46 provided at the outside of the door as well as a longitudinal channel 42 opening to the corresponding edge portion 22 (FIG. 3) of the door leaf 10 to receive this edge portion 22. The depth of the open channel 42 is delimited by a stop 56 provided at one side of the channel. Screw pockets 48 and 50 are provided at the bottom of the closed channel 46 and the open channel 42, respectively, for allowing a cover plate indicated in FIG. 1 to be screwed onto the top end of profile 32. The profile 32 has a hinge portion 34 laterally outside of the closed channel 46.

Figure 8:
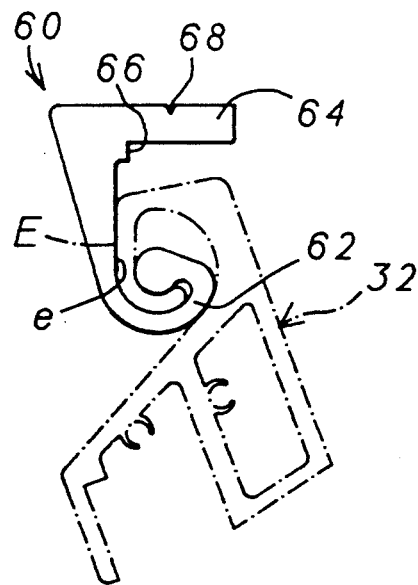
FIG. 8 is an end view of a profile element for the hinge side of the cabinet.

By the fact that the profiles 32, 72 are provided with the closed channels 46 and 78 at the respective opposite longitudinal edges of the outside of the door leaf 10, the profiles are given a very good bending and torsional rigidity, whereby they are able to stiffen or strengthen the longitudinal edge portions of the door. The outside of hinge portion 34 of profile 32 together with the outside of the wall portions of closed channel 46 form a trapezoid ledge or strip that is symmetrical to the trapezoid ledge formed by the outside of the wall portions of the channel 78 of the profile 72 at the opposite longitudinal edge of the door leaf 10. The door is thereby also rendered an attractive appearance. The cabinet profile 60 of the hinge construction 30, i.e. the profile connected to the cabinet frame, has a flange 64 (FIG. 8) connectable to the frame construction 102, and a hinge portion 62 complementary to the hinge portion 34 of the door profile 32.

Figure 9:
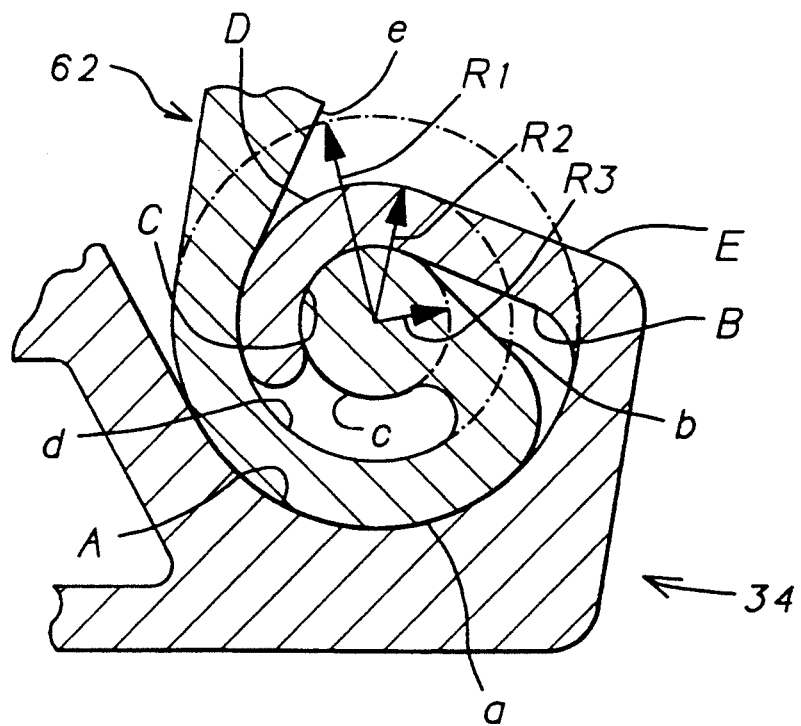
FIG. 9 is an enlarged cross-sectional view of the operative portion of a hinge construction according to the invention.

The interengaging hinge portions 34 and 62, which can be assembled only by being inserted axially sliding into each other, and consequently are interlocked to each other in a radial direction, are shown on a larger scale in FIG. 9. Each of said portions 34 and 62 is formed approximately as a spiral having mutually cooperating partly circular (circular cylindrical as seen in three dimensions) bearing surfaces situated at different radial distances from the pivot bearing axis defined thereby. More specifically, the outer spiral portion 34 has an introductory or entering circular surface A having a large radius R1. The circular inner surface is transformed via a plane or flat surface B to a coaxial partly circular or sub-circular inner surface C having a small radius R3. Profile 34 then continues by a sub-circular outer surface D being opposite to inner surface C and having an intermediate radius R2, and by a flat outer surface E being opposite to flat inner surface B. The inner spiral portion 62 in turn has a pair of opposite initially sub-circular outer and inner respective surfaces a and d adapted to cooperate with the respective surfaces A and D of the profile 34 at the radii R1 and R2, a terminating sub-circular surface c adapted to cooperate with the surface C of the profile 34 at the radius R3, and a flat surface b extending between surfaces a and c and adapted to cooperate with the flat surface B of profile 34 as an end stop in the closed position of the hinge. As an end stop in the open or swung-up position of the hinge, the inner surface (d) of the profile 62 is preceded by a flat surface e adapted to cooperate with the flat surface E of profile 34, as indicated by the swung-out profile 32 shown by phantom lines in FIG. 8. By the embodiment shown and described the hinge is given a very sturdy construction having three coaxial pairs of bearing surfaces A-a, C-c and D-d that simultaneously are in engagement with each other over substantially the whole operational area of the hinge. The mutually cooperating spiral shaped portions 34, 62 functions as stiffening elements which prevent the door from bending outwards in case of large forces and pressures prevailing inside the cabinet, whereby fire-generating and poisonous gases are prevented from issuing out of the cabinet. The hinge has also a specific security function against exiting gas in such extent that the sealing action obtained by the plurality of the cooperating pairs of successive bearing surfaces of the profiles 24 and 62 is enhanced by the pressure generated for example by an electric arc in the cabinet space encased by the door, by virtue of thereby at least some hinge surfaces are pressed against each other.

Figures 3, 4, 5:
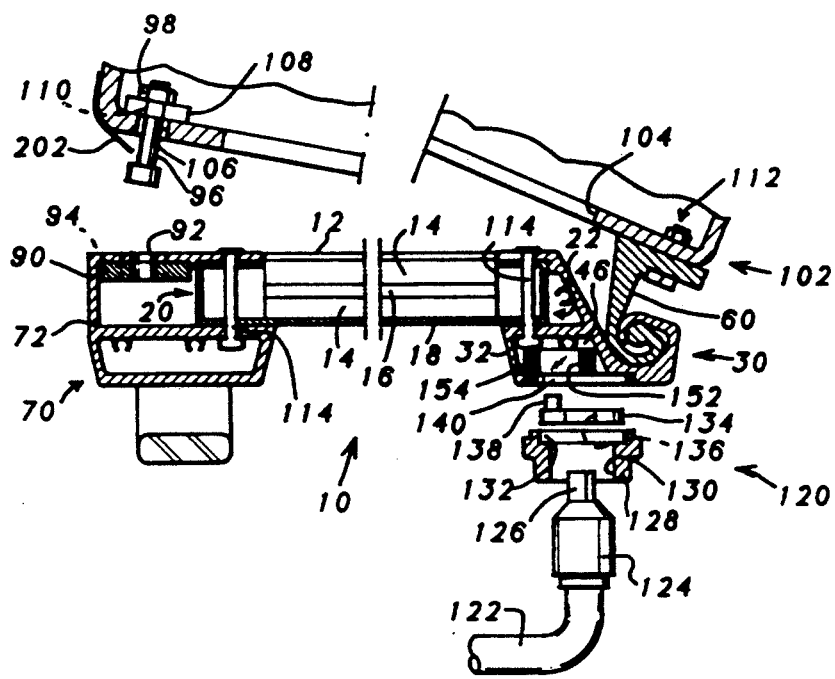
FIG. 3 is a cross-sectional view taken along line 3—3 in FIG. 1.
FIG. 4 is a lateral view of a jacking leg.
FIG. 5 is a top view of the leg shown in FIG. 4.
Figure 6:
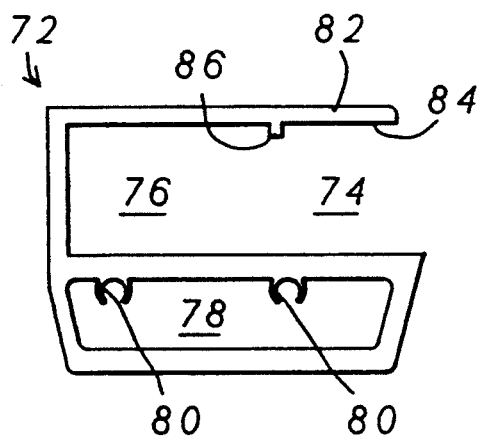
FIG. 6 is an end view of a profile element for the locking side of the door.
Figure 7:
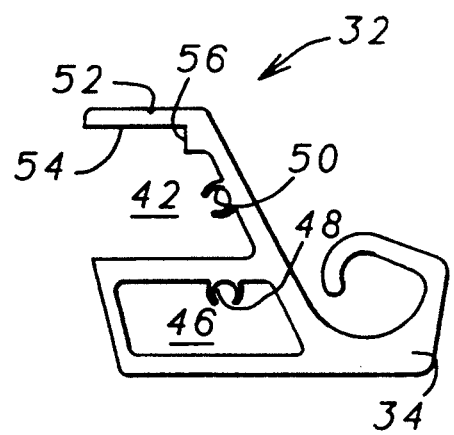
FIG. 7 is an end view of a profile element for the hinge side of the door.

The cabinet profile 60 of the hinge construction 30 is in a suitably manner secured to the frame construction 102 by threaded fasteners 112 (FIG. 3). In order to facilitate the mounting, the flange 64 of the cabinet profile 60 is provided with a longitudinal drilling indication groove 68 and a retaining shoulder 66 for locking engagement with the respective faces of the bolt heads of fasteners 112. Corresponding longitudinal drilling indication grooves are also provided at 82 and 52 on the inner flanges 84 and 54 of the profiles 72 and 32, respectively (FIG. 6 and FIG. 7).

To facilitate the assembly of the independent functional parts of the door, namely the profile 72 including the locking device 70, the door leaf 10, and the door profile 32 including one half of the hinge construction 30, the profiles 32 and 72, as shown in FIG. 3, can be secured to the door leaf by means of blind rivets 114 which, after drilling of connection holes through the profiles and the edge portions 20, 22 of the door leaf 10 and into the closed longitudinal channels 78 and 46 of the profiles, are inserted into the bore holes and anchored with their anchoring heads concealed in the closed channels 78 and 46 respectively.

The outer sheet metal plate 18 of the door leaf 10 is shown in FIG. 3 folded approximately in the shape of a "J" outside of the isolating material 14, 16 of the door leaf 10. The isolating material can however also be recessed into the fold (not shown). The isolating material is preferably the GIBOGI material referred to in the beginning of this description, which material consists of a lamina made of alternating plaster and wood fiber boards 14 and 16, respectively, and being capable of stiffening the sheet steel plate 18 of the door leaf 10, and which material is very resistant and isolating against the high temperatures and pressures that are generated for example at an electrical arc discharge in the cabinet. At its inner face the door leaf 10 can be lined by a cover plate 12 of a suitable material.

FIGS. 3 through 5 show an arrangement for operating the locking and unlocking of the door and including a lever mechanism 120 and a jacking leg 150.

The lever mechanism 120 substantially comprises a perpendicularly angled operating handle 122, a housing 128 and a rotatable disk 134 mounted therein.

The angled engagement end of the handle 122 comprises a cylindrical control portion 124 adapted to be received as a journal bearing in a bore 130 in the housing 128. Opposite thereto within a wider bore 132 in the housing 128, the rotatable disk 134 is mounted. Disk 134 has a central square aperture 136 adapted to receive the engagement end complementary thereto of the angled handle 122 for turning the disk 134. On the disk 134 is also provided a pin 138 eccentrically located and adapted to engage into a transverse slot 152 in the bar 159 of the jacking leg 150. The housing 128 is set into a circular recess 140 at the outer side of the door profile 32 and bolted thereto, as indicated in FIG. 1.

As is apparent from FIG. 1 and FIG. 3, the bar 154 of the jacking leg 150 is extending within the closed longitudinal channel 46 of the profile 32 from the vicinity of the locking mechanism 120 to the lower mouth of the channel 46, where it is terminated by a pressure foot 156. A support member 158 (FIG. 1) for the bottom face of the foot 156 is arranged supported by the floor or by the frame construction (not shown).

From the foregoing description it will be apparent that when the handle 122 inserted into the housing 128 is turned in a counter clockwise direction in FIG. 1, the jacking leg 150 will be displaced downwards such that the foot 156 is brought into engagement with the support member 158 and tending to push the door upwards.

Thereby the door will be displaced relative to the cabinet 100 by longitudinal translation of the hinge portion 34 of the door relative the hinge portion of the frame 62.

When closing the door, the circular openings 94 of the key-hole recesses are aligned with the locking members 96 so that the heads thereof can engage behind the locking bar 90 to lock the door when the door again is lowered by turning the handle 122 back to its original position.

Figure 2:
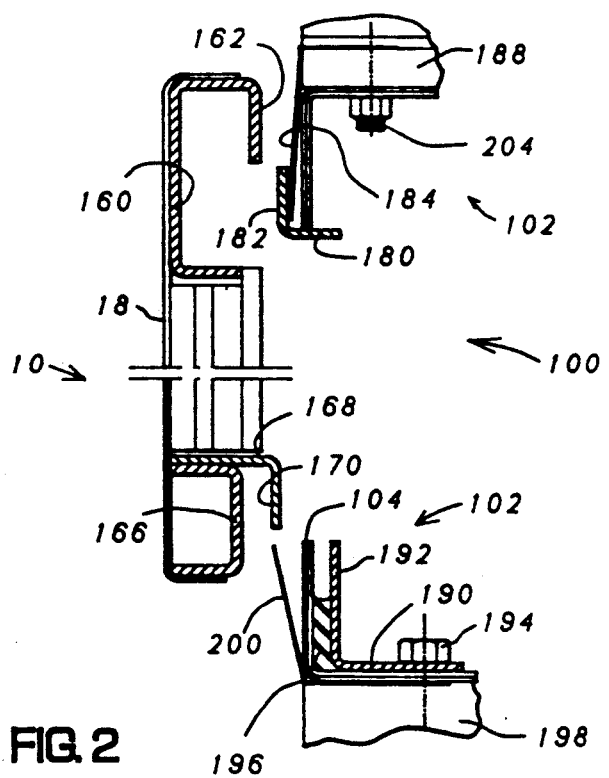
FIG. 2 is an enlarged and somewhat simplified sectional view taken along line 2—2 of FIG. 1 and showing the end portions of the door as well as an adjoining frame construction of a switch cabinet.

In the cross-sectional view according to FIG. 2 the upper and lower portions of the door leaf 10 are shown spaced from the frame construction 102 for more clarity of illustration. The upper portion of the door leaf 10 is terminated by a cross bar or beam 160 having a downwardly oriented flange 162 adjacent to the cabinet 100. Provided at the lower portion of the door leaf 10 is a cross bar or beam 166 and connected to the top face thereof, for example by welding, is a beam 168 having an L-shaped cross-section, the shorter flange 170 of which extends downwardly at a distance from the cross beam 166.

At the upper edge of the door opening of the frame construction 102, in a similar way, a cross beam 180 is arranged having an upwardly oriented flange 182 spaced from the outside of the opening 104. At the bottom edge of opening 104 and at a distance from the inside thereof a cross beam 190 having an upwardly oriented flange 192 is provided.

FIG. 2 shows the door leaf 10 in the lifted or raised position. When the door is closed and the door leaf is lowered by the arrangement described previously, the flanges 162 and 170 of the door leaf 10 will be brought into engagement behind the flange 182 of the frame construction 102 and behind the bottom edge of the opening 104. Thereby the door is locked or retained from all sides at the frame construction 102.

In order to prevent issuance of the poisonous gases that can be generated following an electric arc discharge within the cabinet 100, also sealing means in the shape of angled spring steel leaves, strips or bands 184, 200, 202 are provided at the frame construction 102, as is apparent from FIG. 3 and FIG. 4. The spring steel band 184 provided along the longitudinal top edge of the opening 104, has a bottom edge located behind flange 182 and has its opposite folded-back edge portion inserted into an upper insulation layer 188 for the cabinet and is also retained in place by a screw joint 204. As shown in FIG. 2, the spring steel band 200 situated at the bottom edge of opening 104 is adapted to contact the side facing the cabinet of door leaf cross beam 166 and is in the embodiment shown secured between the frame construction 102 and a base 198 by screw joints 194 (only one is shown). The third angled steel band 202 is suitably connected, for example bolted, to the outside of the frame construction 102 and at the locking portion thereof. At the corners on the locking side of the frame construction 102, the steel band is overlapped from the outside by the steel bands 184, 200 (not shown). Thereby a good sealing action is obtained also in the corners of the door opening.

Since the hinge construction 30 is tight in itself, no further sealing means is required at this side of the frame construction 102.

For additional sealing at the lower edge of the door opening 104 the groove defined between this lower edge and the flange 192 (FIG. 2) may be filled by a suitable sealing compound.

We claim:

1. A door for an electric switch cabinet (100) having a frame (102), comprising a door leaf (10) having a pair of spaced apart vertical edges, said door leaf (10) being made of a material isolating from fire and arcs, a hinge construction (30) at one of said pair of vertical edges of said door leaf (10) and connectable to the cabinet frame 9102), and a locking device (70) cooperating with the cabinet frame (102) at the other of said pair of vertical edges of said door leaf (10), said hinge construction (30) comprising a hinge composed of slidably and pivotally interengaging profile elements (32, 60) extending over the full length of said one of said pair of vertical edges, latch means (162, 170) provided at the upper and lower edges of the door and adapted for engagement with complementary latch means (182, 192) provided at the door frame, a jacking mechanism (120) for vertical displacing the door via said profile elements (32, 60) between a locked, lowered closed position and a raised closed position to bring said latch means (162, 170) and said complementary latch means (182, 192) into and out of engagement, respectively, relative to each other, and said jacking mechanism (120) comprising a jacking leg (150) slidably guided along said hinge construction (30) and operable for engagement with a cabinet understructure for the vertical displacement of said door.

2. A door according to claim 1, wherein the locking device (70) and the hinge construction (30) include separate profile elements (72, 60), respectively, mounted to the vertical edges of the door leaf (10).

3. A door according to claim 2, wherein the jacking leg (150) is slidably guided in a channel (46) of the profile element (32) of the hinge construction (30).

4. A door according to claim 2, wherein the jacking mechanism (120) further comprises an operating disk (134) rotatably mounted to the profile element (32) of the hinge construction (30), said disk (134) having an eccentrically located pin (138) for engagement into a transversely extending slot (152) in the jacking leg (150).

5. A door according to claim 1, wherein the latch means comprises vertical flange elements (162, 170, 182, 192) of across beams (180, 190) provided in the door leaf (10) and in the cabinet frame.

6. A door leaf (10) according to claim 1, wherein elongated leaf spring elements (184, 200, 203) are provided on the cabinet frame for sealing engagement with the inner face of the door leaf (10) when the door is in the lowered closed position of the door.

7. A door according to claim 1, wherein the profile element of the hinge construction (30) each comprises three coaxial, radially separated pivot bearing surfaces (A-a, C-c, D-d).

8. A door according to claim 7, wherein a portion (34) of said one profile element (32) comprises an introductory sub-circular inner surface (A) having a first radius (R1), a terminating sub-circular outer surface (D) having a second radius (R2) which is smaller than the first radius (R1) and a terminating sub-circular inner surface (C) having a third radius (R3) which is smaller than the second radius (R2), and a portion (62) of the other (60) of said profile elements (32, 60) comprises an introductory subcircular outer surface (a) having a radius corresponding to the first radius (R1), an introductory sub-circular inner surface (d) having a radius corresponding to the second radius (R2) and a terminating sub-circular outer surface (c) having a radius corresponding to the third radius (R3).

9. A door according to claim 8, wherein said one profile element portion (34) comprises a section confined by flat surfaces (B, E) between said introductory inner surface (A) and said terminating inner (C) and outer (D) surfaces, and wherein said other profile element portion (62) comprises a flat surface (e) adjoining the introductory inner surface (d) and a flat surface (b) between the introductory outer surface (a) and the terminating outer surface (c).

* * * * *

UNITED STATES PATENT AND TRADEMARK OFFICE
CERTIFICATE OF CORRECTION

PATENT NO. : 5,207,023

DATED : May 4, 1993

INVENTOR(S) : Leif Forsberg, et al.

It is certified that error appears in the above-indentified patent and that said Letters Patent is hereby corrected as shown below:

Column 5, line 7, "159" should be --154--

Column 6, line 32, "9102)" should be --(102)--

Column 6, line 41, "vertical" should be --vertically--.

Signed and Sealed this

Fourth Day of January, 1994

Attest:

BRUCE LEHMAN

*Attesting Officer*           Commissioner of Patents and Trademarks